Nov. 12, 1940.    M. M. KINLEY    2,221,427
SWAB
Filed March 29, 1937
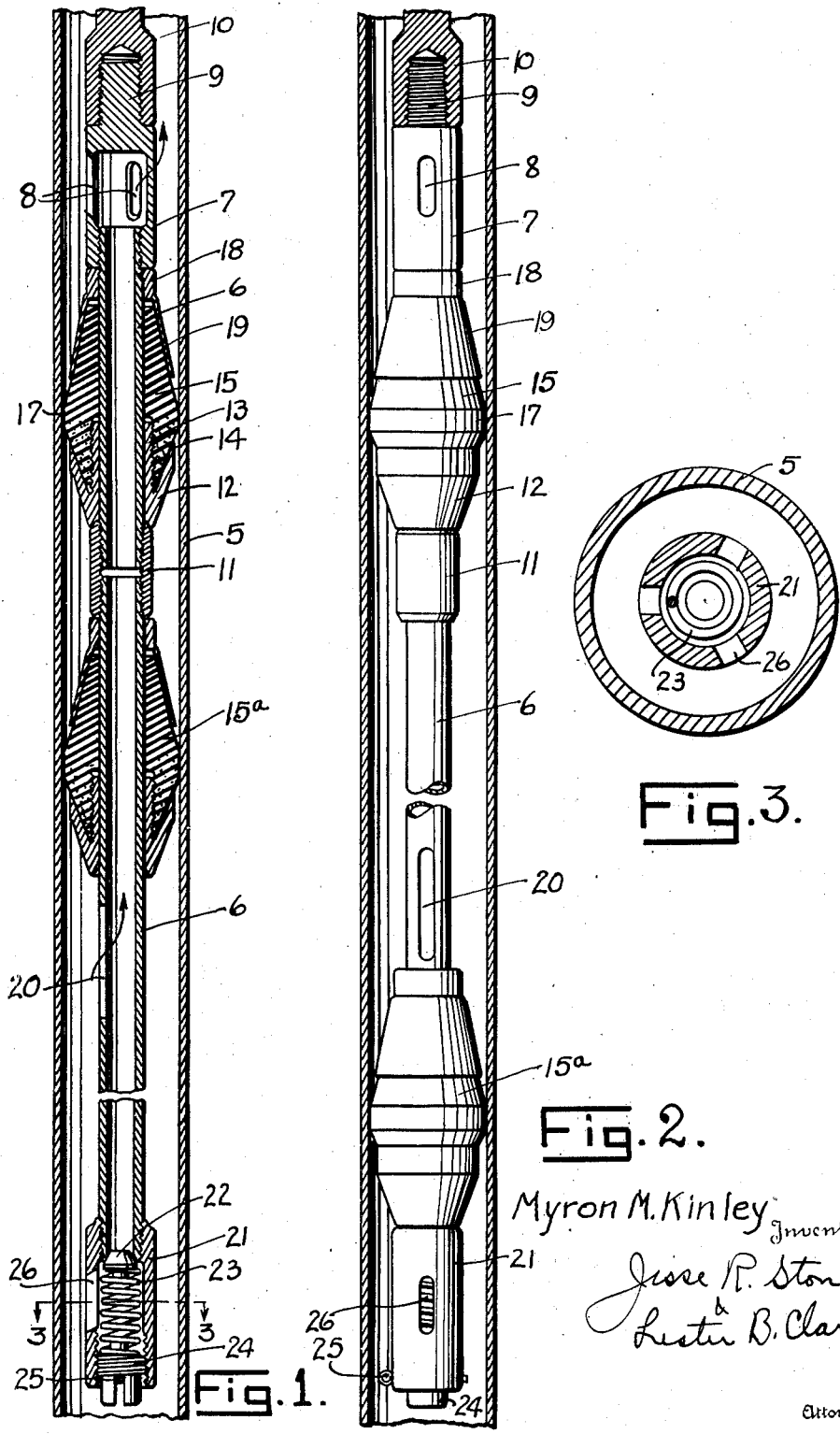
Myron M. Kinley, Inventor
Jesse R. Stone
Lester B. Clark
Attorneys Patented Nov. 12, 1940

2,221,427

UNITED STATES PATENT OFFICE 2,221,427

SWAB

Myron M. Kinley, Houston, Tex.

Application March 29, 1937, Serial No. 133,539

5 Claims. (Cl. 103—225)

My invention relates to swabs such as are employed in deep well work in lifting liquids from wells. Such devices are normally employed in well casing or in well tubing to raise comparatively large loads of liquid above the swab at each trip into the well.

It is an object of this invention to provide a swab having a free opening therethrough for passage of liquid when the device is lowered into the well, but which is adapted to securely seal with the pipe when said swab is moved upwardly with its load of liquid.

It is another object to provide a swab with a plurality of sealing rubbers thereon, one of which is slidable on the supporting mandrel to open or close the passage through said mandrel.

I also aim to construct a particularly effective form of swab rubber which will be strong and durable and yet which will seal closely with the pipe in which it is operated.

The device also includes an effective unloading valve acting to relieve the swab of any excess of liquid over the amount which it is safe to lift.

In the drawing herewith

Fig. 1 is a central longitudinal section through a swab employing my invention.

Fig. 2 is a similar view showing the swab in elevation.

Fig. 3 is a transverse section on the plane 3—3 of Fig. 1 shown somewhat enlarged.

In the drawing my swab is shown as used within a pipe 5 which may be the well casing. The swab includes a tubular mandrel 6, at the upper end of which is secured a collar or cage 7 having openings 8 therein to permit passage of fluid. The upper end of the collar is formed with a threaded shank 9 for attachment to a line or cable by means of the socket 10.

Spaced downwardly from the collar 7 is a coupling 11 which forms a support for the upper swab member. Said swab member includes a lower cup 12 which has an inner collar or thimble 13 fitting closely upon said mandrel and having outer threads or corrugations to frictionally engage within the downwardly tapered lower end 14 of the swab rubber 15.

Said rubber is tapered in opposite directions from an intermediate point 17 and may be of rubber or some equivalent material. I desire that the lower end be of comparatively soft but tough rubber, as indicated by the stippling on the drawing. The upper end is preferably of comparatively hard rubber as indicated by the heavier sectioning at that end.

I provide an upper protecting and reenforcing member including a collar 18 and a downwardly flaring skirt 19 fitting closely along the upper tapered end of the rubber. It will be seen that this swab member has only its intermediate enlarged area 17 in contact with the pipe but this area may be under compression in the pipe and forms a fluid seal therewith due to the load of fluid pressing on the surface 15.

Below the upper swab member the mandrel is formed with a large opening 20 for the entrance of liquid to the mandrel. At the lower end of said mandrel is secured a valve cage 21 having therein a valve 22 held upwardly into its seat to close the lower end of the mandrel by a compression spring 23. Said spring is supported upon a longitudinally adjustable plug 24 which may be locked against unscrewing by a transverse locking pin 25. The spring is adjusted to hold said valve closed with a predetermined pressure. When the load of liquid above the swab is in excess of a suitable amount, the valve will unseat to allow the excess to leak past the same. A lateral opening 26 permits escape of such fluid.

Between the cage 21 and the collar 11 is a second swab rubber 15a of the same construction as rubber 15, but it is slidable on the mandrel between the said collar and cage and from a position above the opening 20 to a position below the same, or vice versa, depending upon the direction of movement of the swab mandrel.

In the operation of this device it is assembled as shown in the drawing and lowered downwardly into the well and into the liquid standing in the casing until it assumes a position submerged in the liquid a proper distance to provide a load above the swab such as is safe to lift as one load. If, for example, the swab is intended to lift four barrels of liquid at one time it will be submerged so as to obtain such a load above the swab. If by chance the load above the swab is in excess of the amount which is desired the valve 22 is arranged to unseat against the pressure of the spring 23 to allow the excess to pass out the lower end.

It will be seen that as the swab is lowered the swab member 15a will be forced upwardly along the mandrel to the position shown in Fig. 1. There will, therefore, be a large opening at 20 through which the liquid from below the swab may pass upwardly as the swab is lowered. When the proper submergence is obtained the device will be pulled upwardly and as the mandrel is thus moved the lower swab member 15a will slide backwardly along the mandrel to the position shown in Fig. 2 below the openings 20. The fluid above the swab will thereby be entrapped within the casing above the swab and will be brought upwardly to the surface by the movement of the swab.

An advantage in this construction is that it is of simple and economical construction and may be operated rapidly. As it is dropped downwardly through the liquid the liquid below the swab has a free open passage through the mandrel while the swab is being lowered. Its passage through the liquid will therefore be comparatively rapid. When the device is pulled upwardly, however, this opening will be shut off so that the fluid above will be entrapped so as to be carried upwardly with the swab. The provision of the unloading valve 22 provides against any overload of liquid above the swab and in its construction is exceedingly simple and easily adjusted.

The particular construction of the swab rubber is extremely effective. It has soft rubber adjacent the lower end and is well reenforced by the cup 12, while at the upper end it is of hard rubber which will not be unduly distorted by the load of liquid above and will tend to maintain its shape and yet provide an efficient and positive seal.

The only support for the rubber is the cup 12 so that as the pressure of the fluid load is applied to the upper tapered surface there will be a tendency for the rubber to expand and maintain a proper seal with the pipe. The threaded or ribbed area 13 tends to frictionally retain the rubber yet it may be easily replaced.

What is claimed as new is:

1. A swab for wells including a tubular mandrel, upper and lower outlets in said mandrel, a valve in said lower outlet adapted to open under a predetermined pressure from above, a packing rubber fixed adjacent the upper end of said mandrel, an opening in said mandrel below said rubber, and a second swab rubber slidable on said mandrel to positions above or below said opening and adapted to form a seal with the outer surface of the mandrel.

2. A swab for wells including a tubular mandrel, upper and lower outlets in said mandrel, means normally closing the lower outlet in said mandrel, a packing rubber fixed adjacent the upper end of said mandrel, an opening in said mandrel below said rubber, and a second swab rubber slidable on said mandrel to positions above or below said opening.

3. A swab for wells adapted to fit within a pipe in the well including, a tubular mandrel, a valve normally closing the lower end thereof, but adapted to unseat under a predetermined pressure downwardly within the mandrel, a sealing member fixed to the mandrel and adapted to seal between said mandrel and said pipe adjacent the upper end of said mandrel, an opening in said mandrel below said member, and means comprising a lower sealing member to close the passage of fluid between said mandrel and said pipe below said opening responsive to a longitudinal movement of said mandrel in said pipe, said means being slidable on said mandrel.

4. A swab for wells adapted to fit within a pipe in the well including, a tubular mandrel, an overload relief valve normally closing the lower end thereof, a sealing member formed to seal between said mandrel and said pipe adjacent the upper end of said mandrel, an opening in said mandrel below said member, and a second sealing member slidable on the mandrel to close the passage of fluid between said mandrel and said pipe below said opening responsive to a longitudinal movement of said mandrel in said pipe.

5. A swab for wells including a tubular mandrel having an outlet adjacent its upper end, a packing rubber fixed upon the mandrel below said outlet, an opening in the mandrel below said packing rubber, and a second swab rubber slidable on the mandrel to positions above and below said opening and adapted to form a seal between the mandrel and a surrounding pipe.

MYRON M. KINLEY.